United States Patent [19]
Gorres et al.

[11] 3,942,502
[45] Mar. 9, 1976

[54] AIR COMPRESSING FOUR CYCLE RECIPROCATING-PISTON INTERNAL COMBUSTION ENGINE

[75] Inventors: Bruno Gorres, Schanbach; Oswald Schuldt, Korb; Friedrich H. van Winsen, Kirchheim, all of Germany

[73] Assignee: Daimler-Benz Aktiengesellschaft, Stuttgart, Germany

[22] Filed: Dec. 11, 1973

[21] Appl. No.: 423,819

[30] Foreign Application Priority Data
Dec. 13, 1972 Germany.............................. 2260798

[52] U.S. Cl............ 123/195 R; 192/112; 74/606 R
[51] Int. Cl.²............................................. F02F 7/00
[58] Field of Search ... 74/606 R; 123/192 B, 195 R; 192/112

[56] References Cited
UNITED STATES PATENTS

| | | | |
|---|---|---|---|
| 1,872,862 | 8/1932 | Wise ..................................... | 74/606 |
| 2,397,434 | 3/1946 | Ricart ......................... | 123/195 R X |
| 2,643,510 | 6/1953 | Kiekhaefer................. | 123/195 R X |
| 3,183,794 | 5/1965 | Hind ........................... | 123/195 R X |
| 3,263,521 | 8/1966 | Muller ................................. | 74/606 |
| 3,402,707 | 9/1968 | Heron ............................ | 123/192 B |
| 3,722,321 | 3/1973 | Walker et al. ..................... | 74/606 R |

FOREIGN PATENTS OR APPLICATIONS

| | | | |
|---|---|---|---|
| 1,001,483 | 2/1952 | France.................................. | 92/261 |
| 121,626 | 7/1927 | Switzerland.......................... | 92/261 |

OTHER PUBLICATIONS

*Engineering Manual*, R. H. Perry, 2nd Edition, 1967, McGraw Hill, Inc., pp. 8–14, 8–15, Secs. 8–4.

*Primary Examiner*—Charles J. Myhre
*Assistant Examiner*—William C. Anderson
*Attorney, Agent, or Firm*—Craig & Antonelli

[57] ABSTRACT

An air-compressing four-cycle reciprocating piston injection internal combustion engine forming a driving engine of a motor vehicle, to which is flangedly connected a transmission by way of a clutch; the connections between the internal combustion engine and the clutch and/or between the clutch and the transmission are provided with such reinforcements that the natural frequencies of the oscillatory system, which includes the masses of the internal combustion engine, of the clutch and of the transmission, are higher than the frequencies of the dangerous exciting oscillations caused by the internal combustion engine constructed as five-cylinder in-line internal combustion engine which cannot be compensated for with the use of acceptable expenditures.

18 Claims, 6 Drawing Figures ial combustion engine, to be referred to hereinafter for the sake of brevity as internal combustion, as driving internal combustion engine in a motor vehicle to which is flangedly connected a transmission by way of a clutch.

AIR COMPRESSING FOUR CYCLE RECIPROCATING-PISTON INTERNAL COMBUSTION ENGINE

The present invention relates to an air-compressing four-cycle reciprocating-piston internal combustion engine, to be referred to hereinafter for the sake of brevity as internal combustion, as driving internal combustion engine in a motor vehicle to which is flangedly connected a transmission by way of a clutch.

As is known, in such types of internal combustion engines, oscillations and vibrations occur as a result of free forces and moments, which are caused by rotating and oscillating non-balanced masses. These forces and moments should be balanced as much as possible and should be kept small. Special problems arise in internal combustion engines having an asymmetric crankshaft, especially in five cylinder in-line internal combustion engines, since in that case forces and moments which can be balanced out only with considerable expenditures, cause dangerous oscillations and vibrations in larger numbers than, for example, in four-cylinder and six-cylinder in-line internal combustion engines.

The present invention is concerned with the task to assure with tolerable expenditures that no oscillations and vibrations occur which are dangerous for the internal combustion engine, the clutch and the transmission.

The underlying problems are solved according to the present invention in that the connections between the internal combustion engine and the clutch and/or between the clutch and the transmission is provided with such reinforcements that the natural frequencies of the oscillatory system having the masses of the internal combustion engine, the clutch and the transmission are higher than the frequencies of the dangerous exciting oscillations caused by the internal combustion engine constructed as five-cylinder in-line internal combustion engine which cannot be compensated for with tolerable expenditures.

In the practical application of the present invention, all forces and moments which may become dangerous and which cannot be compensated for or at least partially balanced with tolerable expenditures in a known manner by means of rotating auxiliary masses, are thus to be rendered harmless in this manner. The dangerous exciting oscillations which therebeyond occur in five-cylinder in-line internal combustion engines, are rendered harmless according to the present invention in that the natural frequencies of the mentioned oscillatory system always lie above the exciting frequencies so that no resonance can occur. The present invention therebeyond additionally teaches how the natural frequencies can be displaced sufficiently high, namely, by reinforcements of the connections between the internal combustion engine and the clutch and/or the clutch and the transmission. One may thereby imagine that the reinforcements, like the use of springs, act with a larger spring constant which are disposed in the described oscillatory system between the masses of internal combustion engine, clutch and transmission. The reinforcements according to the present invention can be realized with considerably smaller expenditures than the balance of all dangerous oscillations and vibrations in the usual manner.

A particularly advantageous construction of the present invention resides in that the natural frequencies are higher than the frequencies of the tilting oscillations which are excited by the moments of the second order, caused by the oscillating masses of the internal combustion engine. A compensation or balance of these moments of the second order is possible only by a high technical expenditure. According to the present invention, the balance is circumvented and the technical expenditure connected therewith is avoided.

An effective embodiment of the reinforcements may consist in that the upper wall of the essentially box-shaped transmission housing is constructed inclined to the longitudinal axis of the transmission housing over the entire length thereof or over a partial length, rising toward the clutch housing, and in that the upper wall of the clutch housing adjoins this wall so that the separating surfaces between clutch housing and transmission housing are extended in the upward direction beyond the space requirements of the clutch, properly speaking, and of the transmission, properly speaking.

In a further advantageous construction of the present invention, the upper wall of the transmission housing is constructed inclined at least over half the length thereof.

Furthermore, the upper wall also of the clutch housing may be inclined and may subtend with the longitudinal axis thereof exactly the same or approximately the same angle of inclination as the upper wall of the transmission housing. A particularly sturdy and rigid connection between transmission housing and clutch housing results therefrom since the force flow is transmitted between these two parts without bend.

The angle of inclination which the upper wall of the transmission housing and possibly of the clutch housing subtends with the longitudinal axis, amounts advantageously to about 20°. With an angle of inclination of this magnitude the upper wall is still rigid in the longitudinal direction, yet, on the other, the wall drops off toward the end of the transmission housing so rapidly that only little space for the reinforcement is necessitated thereat.

A further advantageous construction of the present invention consists in an internal combustion engine having an oil pan in that the oil pan is provided on each side within its lower area with ribs which taper leading away from the connecting flange toward the cltuch housing or an intermediate housing. These measures according to the present invention represent a considerable reinforcement of the connection of the oil pan or sump and therewith of the internal combustion engine with the clutch housing or the intermediate housing. A further increase of the natural frequencies of the aforementioned oscillatory system is attainable thereby so that a larger distance to the dangerous exciting oscillations is gained thereby or the connection of the clutch housing and transmission housing can be constructed somewhat less rigid without decreasing the natural frequencies.

The ribs of the oil pan may each form within the area of the connecting flange a trussing framework or lattice network which tapers into a single rib. In this manner, the forces absorbed by the connecting flange are transmitted continuously in the longitudinal direction to the oil pan by way of the ribs.

A further reinforcement of the engine-transmission block and therewith a further increase of the natural frequency thereof can be achieved in that in the presence of an intermediate housing between internal combustion engine and clutch housing, the intermediate housing is provided at least on the surface which abuts at the internal combustion engine, with rib means which may be constructed framework-like or honeycomb-shaped.

Accordingly, it is an object of the present invention to provide an air-compressing four-cycle reciprocating internal combustion engine which avoids by simple means the aforementioned shortcomings and drawbacks encountered in the prior art.

Another object of the present invention resides in an air-compressing four-cycle reciprocating piston internal combustion engine in which no oscillations or vibrations dangerous for the internal combustion, the clutch and the transmission can occur.

A further object of the present invention resides in an internal combustion engine of the type described above in which all forces and moments which may become dangerous and which cannot be compensated for by the use of acceptable expenditures, are rendered harmless.

Still a further object of the present invention resides in a five-cylinder in-line internal combustion engine in which the dangerous exciting oscillations are rendered harmless.

Still another object of the present invention resides in an internal combustion engine, clutch and transmission unit provided with such reinforcements that any imbalances that may remain, are rendered inconsequential.

These and further objects, features, and advantages of the present invention will become more apparent from the following description when taken in connection with the accompanying drawing, which shows, for purposes of illustration only, one embodiment in accordance with the present invention, and wherein.

Figure 1:
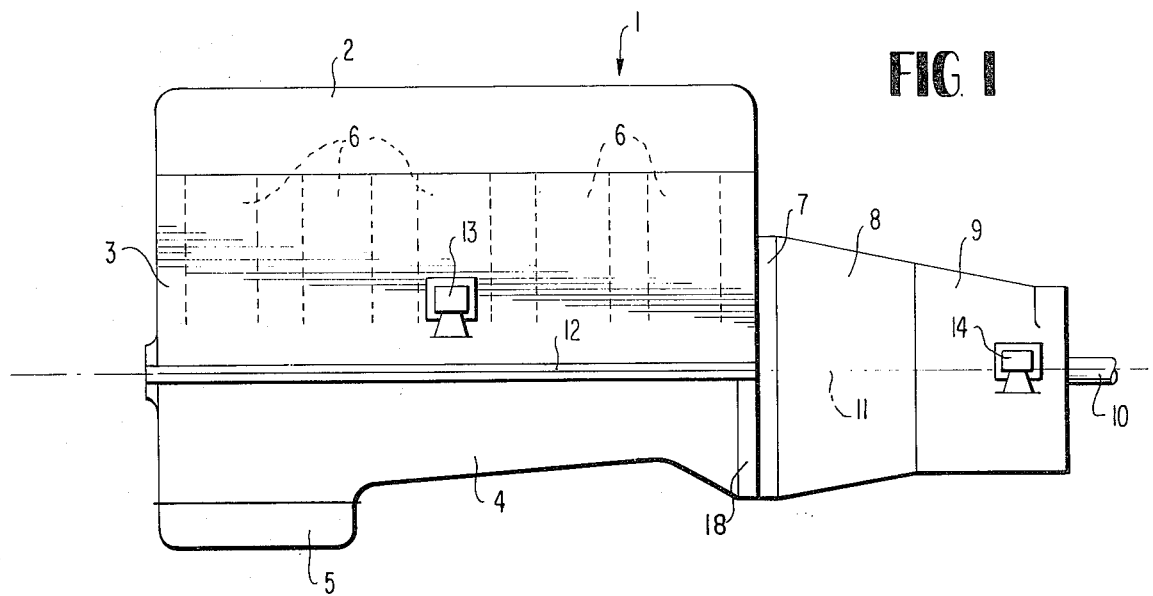
FIG. 1 is a schematic side elevational view of a four-cycle reciprocating-piston injection-type internal combustion engine with an intermediate housing, a clutch housing and a transmission housing in accordance with the present invention.

Referring now to the drawing wherein like reference numerals are used throughout the various views to designate like parts, the internal combustion engine which is generally designated in FIG. 1 by reference numeral 1, essentially consists of a cylinder head housing 2, a cylinder housing 3 as well as of an upper part 4 and of a lower part 5 of an oil pan or sump. Five cylinders 6 which are arranged in-line, are thereby arranged in the cylinder housing 3 as schematically indicated in FIG. 1. A clutch housing 8 and a transmission housing 9 are flangedly connected to the internal combustion engine at an end face thereof by way of an intermediate housing 7. Even though reference is made hereinafter in the instant application to a clutch housing 8, it is to be understood that the clutch housing 8 may also accommodate a fluid coupling or hydrodynamic torque converter in lieu of a mechanical clutch. A drive shaft 10 for the motor vehicle (not shown) which is driven by means of the internal combustion engine 1, leaves the transmission housing 9 in the longitudinal axis 11 of the transmission housing 9 and of the clutch housing 8, whereby the axis 11 simultaneously lies in the separating plane 12 between the cylinder housing 3 and the upper part 4 of the oil pan. The internal combustion engine 1, the clutch housing 8 and the transmission housing 9 are supported laterally in the motor vehicle by means of one bearing support 13 each on each side of the internal combustion engine 1 in proximity to the center of gravity thereof and one bearing support 14 each at the transmission housing 9 in proximity to the outlet of the drive shaft 10.

Figure 2:
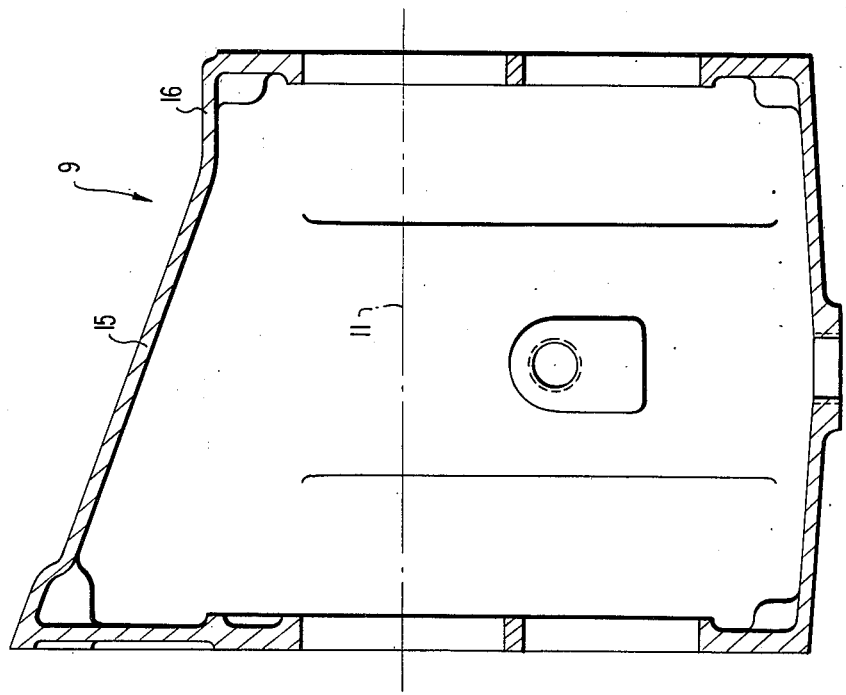
FIG. 2 is a longitudinal cross-sectional view through the transmission housing according to the present invention.

It can be readily seen in the transmission housing 9 illustrated on a larger scale in FIG. 2 that the upper wall 15 of the transmission housing 9 is constructed inclined over a part of its length with respect to the longitudinal axis 11, and more particularly rising toward the clutch housing 8 disposed toward the left of the transmission housing 9 as viewed in FIG. 1. The upper wall 15 is inclined only over a distance of about four-fifths of the length of the transmission housing 9 and passes over into a part 16 parallel to the longitudinal axis 11 by way of a rounded-off portion having a relatively small radius of curvature. The angle of inclination of the upper wall 15 with respect to the longitudinal axis 11 amounts to about 20°.

Figure 3:
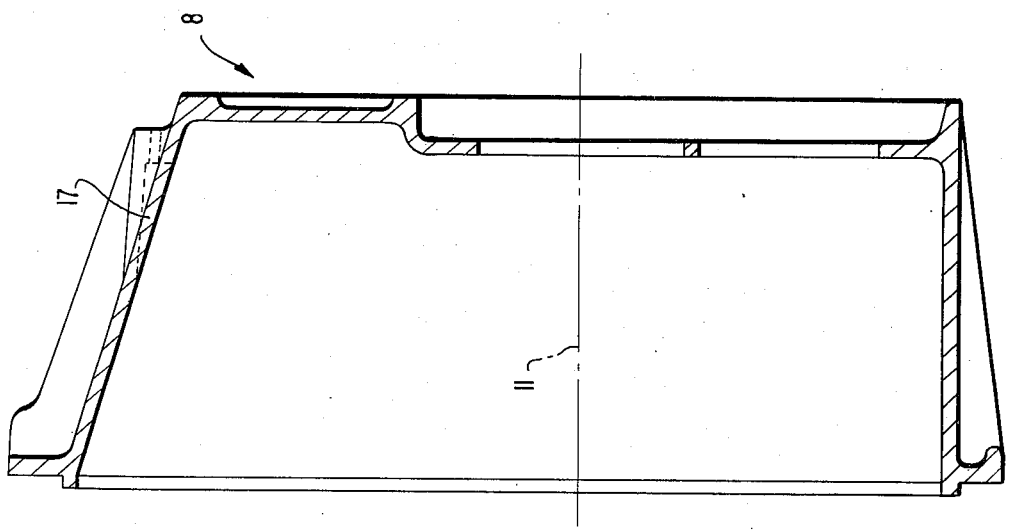
FIG. 3 is a longitudinal cross-sectional view through the clutch housing in accordance with the present invention.

In the clutch housing 8 illustrated in FIG. 3, the upper wall 17 is inclined over the entire length thereof with respect to the longitudinal axis 11 by the same angle of inclination as the upper wall 15 of the transmission housing 9. The two upper walls 15 and 17 are therefore disposed in one plane so that a particularly favorable force flow together with a very sturdy connection therebetween results from such an arrangement.

Figure 4:
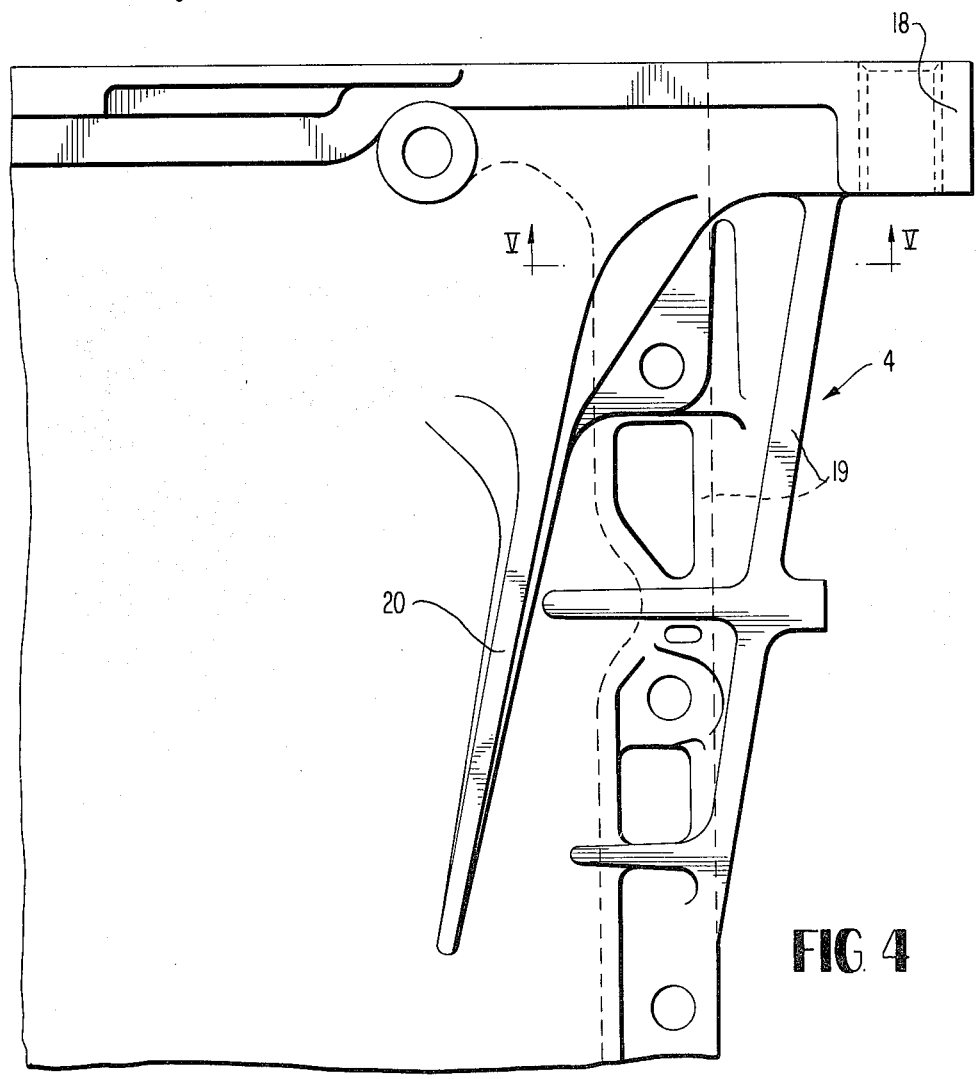
FIG. 4 is a partial bottom plan view of the upper part of the oil pan of the internal combustion engine according to the present invention.
Figure 5:
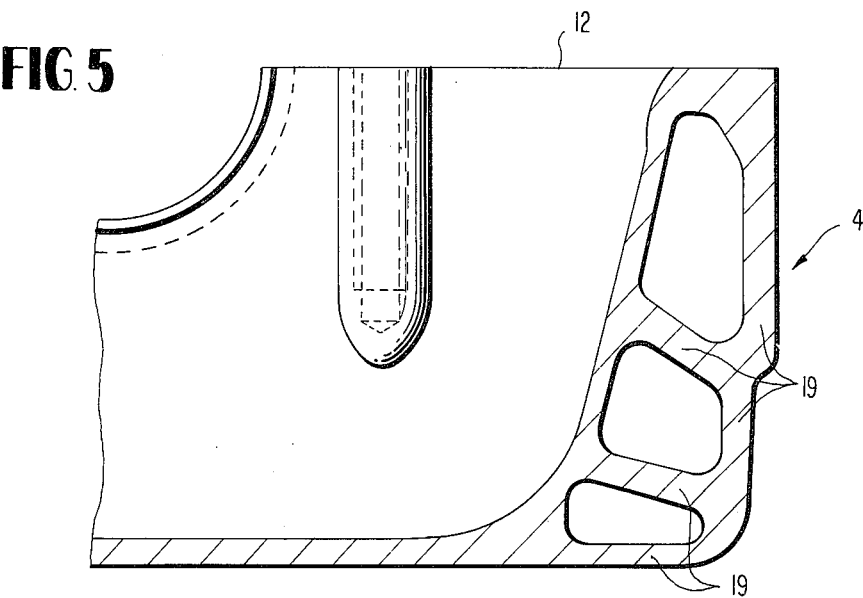
FIG. 5 is a cross-sectional view taken along line V—V through the upper part of the oil pan of FIG. 4; but without the connecting flange shown in FIG. 4

The upper part 4 of the oil pan which is partially illustrated in FIG. 4 in a view from below, is connected by means of a flange 18 with the clutch housing 8 by way of the intermediate housing 7. For purposes of support of the flange 18 and therewith for the reinforcement of the connection between the upper part 4 of the oil pan and the clutch housing 8, ribs 19 are arranged on each side of the upper part 4. These ribs 19 form in proximity to the flange 18 a trussing framework as can be readily recognized in FIG. 5 so that it is able to conduct large forces away from the flange 18. These forces are continuously distributed over the upper part 4 of the oil pan whereby the trussing tapers leading away from the flange 18. Furthermore, for purposes of reinforcement of the upper part 4 of the oil pan, one rib 20 each (FIG. 4) is provided laterally on the bottom side thereof which tapers leading away from the flange 18 and thus forces can be transmitted continuously from the flange 18 to the upper part 4.

Figure 6:
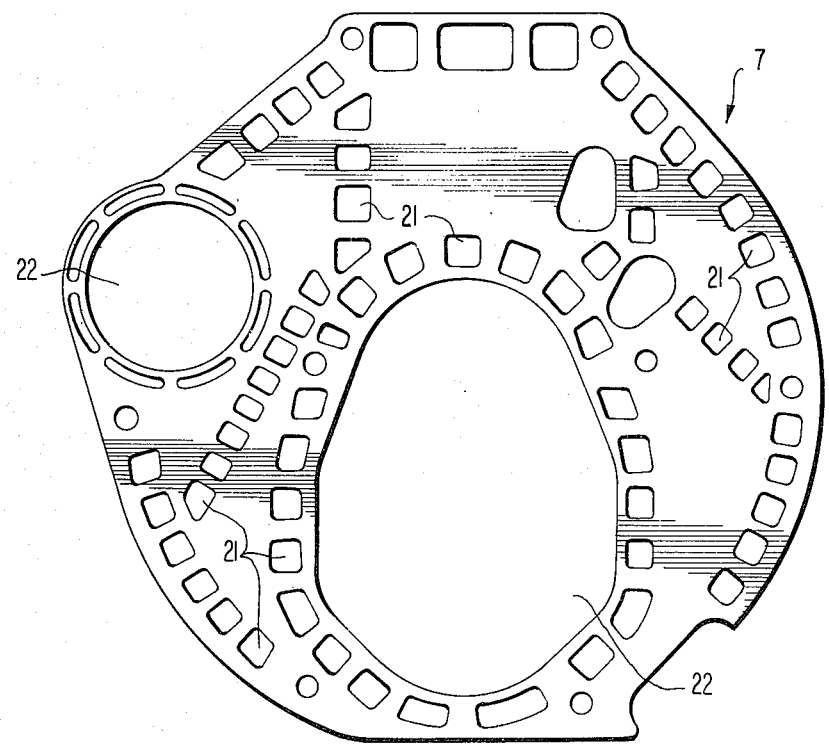
FIG. 6 is an elevational view of the intermediate housing taken in the direction from the internal combustion engine.

FIG. 6 illustrates clearly that the surface of the intermediate housing 7 is provided with a rib structure which is constructed truss- or framework-like or honeycomb-shaped. These rib means 21 surround in particular the apertures 22 in the intermediate housing so that also in this area the intermediate housing 7 is constructed very rigid and little yielding.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An air-compressing four-cycle reciprocating internal combustion engine to which is flangedly connected transmission housing means by way of clutch housing means which house, respectively, transmission means and clutch means. the connections between at least two of the parts consisting of the internal combustion engine, the clutch housing means and the transmission housing means are provided with such reinforcement means as to define an oscillatory system having the masses of the internal combustion engine, at least one of the clutch housing means and the transmission housing means, wherein the natural frequencies of said oscillatory system are higher than the frequencies of the oscillations which are excited by the moment of the second order, caused by the oscillating masses of the internal combustion engine, the transmission housing means being substantially box-shaped and including upper wall means inclined with respect to the longitudinal axis of the transmission housing means at least over half the length thereof, rising in the direction toward the clutch housing means, said clutch housing means including upper wall means adjoining the upper wall means of the transmission housing means so that the separating surfaces between the clutch housing means and transmission housing means are extended in the upward direction beyond the space requirements of the clutch and of the transmission means housed within said housing means, and the upper wall means is inclined and subtends with the longitudinal axis thereof at least approximately the same angle of inclination as the upper wall means of the transmission housing means, wherein the angle of inclination which the upper wall means of the transmission housing means subtends with the longitudinal axis, amount to about 20°.

2. An internal combustion engine according to claim 1, characterized in that the angle of inclination which the upper walls means of the clutch housing means subtends with the longitudinal axis, amounts to about 20°.

3. An air-compressing four-cycle reciprocating internal combustion engine, to which is flangedly connected transmission housing means by way of clutch housing means which house, respectively, transmission means and clutch means, the connection between at least two of the parts consisting of the internal combustion engine, the clutch housing means and the transmission housing means are provided with such reinforcement means as to define an oscillatory system have the masses of the internal combustion engine, at least one of the clutch housing means and the transmission housing means, wherein the natural frequencies of said oscillatory system are higher than the frequencies of the oscillations which are excited by the moments of the second order, caused by the oscillating masses of the internal combustion engine, the transmission housing means being substantially box-shaped and including upper wall means inclined with respect to the longitudinal axis of the transmission housing means at least over half the length thereof, rising in the direction toward the clutch housing means, said clutch housing means including upper wall means adjoining the upper wall means of the transmission housing means so that the separating surfaces between the clutch housing means and transmission housing means are extended in the upward direction beyond the space requirements of the clutch and of the transmission means housed within said housing means, and the upper wall means is inclined and subtends with the longitudinal axis thereof at least approximately the same angle of inclination as the upper wall means of the transmission housing means, and an oil pan means which includes within its lower area on each side thereof rib means tapering away from a connecting flange means to one of the two parts consisting of clutch housing means and intermediate housing means.

4. An internal combustion engine according to claim 3, characterized in that tapering rib means are provided laterally on a bottom side of the oil pan means such that forces can be transmitted from the flange means to the oil pan means.

5. An internal combustion engine according to claim 3, characterized in that the rib means form within the area of the connecting flange means a tapering framework.

6. An internal combustion engine according to claim 3, with an intermediate housing, characterized in that the intermediate housing is provided at least on a surface which adjoins the internal combustion engine with rib means.

7. An internal combustion engine according to claim 6, characterized in that said rib means are framework-like.

8. An internal combustion engine according to claim 6, characterized in that said rib means are constructed honey-comb-shaped.

9. An internal combustion engine according to claim 3, characterized in that the angle of inclination which the upper wall means of the transmission housing means subtends with the longitudinal axis, amounts to about 20°.

10. An internal combustion engine according to claim 3, characterized in that the angle of inclination which the upper wall means of the clutch housing means subtends with the longitudinal axis, amounts to about 20°.

11. An air-compressing four-cycle reciprocating internal combustion engine to which is flangedly connected transmission housing means by way of clutch housing means which house, respectively, transmission means and clutch means, the connections between at least two of the parts consisting of the internal combustion engine, the clutch housing means and the transmission housing means are provided with such reinforcement means as to define an oscillatory system having the masses of the internal combustion engine, at least one of the clutch housing means and the transmission housing means, such reinforcement means being provided in the connections between the internal combustion engine and the clutch housing means and between the clutch housing means and the transmission housing means, said transmission housing means being substantially box-shaped and including upper wall means inclined with respect to the longitudinal axis of the transmission housing means, rising in the direction toward the clutch housing means, said clutch housing means including upper wall means adjoining the upper wall means of the transmission housing means so that the separating surfaces between the clutch housing means and transmission housing means are extended in the upward direction beyond the space requirements of the clutch means and of the transmission means, characterized in that the angle of inclination which the upper wall means of the transmission housing means subtends with the longitudinal axis, amounts to about 20°.

12. An internal combustion engine according to claim 11, characterized in that the angle of inclination which the upper wall means of the clutch housing means subtends with the longitudinal axis, amounts to about 20°.

13. An air-compressing four-cycle reciprocating internal combustion engine to which is flangedly connected transmission housing means by way of clutch housing means which house, respectively, transmission means and clutch means, the connections between at least two of the parts consisting of the internal combustion engine, the clutch housing means and the transmission housing means are provided with such reinforcement means as to define an oscillatory system having the masses of the internal combustion engine, at least one of the clutch housing means and the transmission housing means, and an oil pan means which includes within its lower area on each side thereof rib means tapering away from a connecting flange means to one of the two parts consisting of clutch housing means and an intermediate housing.

14. An internal combustion engine according to claim 13, characterized in that the rib means form within the area of the connecting flange means a tapering framework.

15. An air-compressing four-cycle reciprocating internal combustion engine to which is flangedly connected transmission housing means by way of clutch housing means which house, respectively, transmission means and clutch means, the connections between at least two of the parts consisting of the internal combustion engine, the clutch housing means and the transmission housing means are provided with such reinforcement means as to define an oscillatory system having the masses of the internal combustion engine, at least one of the clutch housing means and the transmission housing means, and an intermediate housing provided at least on the surface adjoining the internal combustion engine with rib means, characterized in that said rib means are framework-like.

16. An air-compressing four-cycle reciprocating internal combustion engine to which is flangedly connected transmission housing means by way of clutch housing means which house, respectively, transmission means and clutch means, the connections between at least two of the parts consisting of the internal combustion engine, the clutch housing means and the transmission housing means are provided with such reinforcement means as to define an oscillatory system having the masses of the internal combustion engine, at least one of the clutch housing means and the transmission housing means, and an intermediate housing provided at least on the surface adjoining the internal combustion engine with rib means, characterized in that said rib means are constructed honey-comb-shaped.

17. An air-compressing four-cycle reciprocating internal combustion engine to which is flangedly connected transmission housing means by way of clutch housing means which house, respectively, transmission means and clutch means, the connections between at least two of the parts consisting of the internal combustion engine, the clutch housing means and the transmission housing means are provided with such reinforcement means as to define an oscillatory system having the masses of the internal combustion engine, at least one of the clutch housing means and the transmission housing means, such reinforcement means are provided in the connections between internal combustion engine and clutch means and between clutch means and transmission means, said transmission housing means being substantially box-shaped and including upper wall means inclined with respect to the longitudinal axis of the transmission housing means at least over a part of the length thereof, rising in the direction toward the clutch housing means, said clutch housing means including upper wall means adjoining the upper wall means of the transmission housing means so that the separating surfaces between the clutch housing means and transmission housing means are extended in the upward direction beyond the space requirements of the clutch means and of the transmission means, the upper wall means of the clutch housing means being inclined and subtending with the longitudinal axis thereof the same angle of inclination as the upper wall means of the transmission housing means, an intermediate housing means connecting the internal combustion engine and the clutch housing means and being provided with rib means at least on a surface which adjoins the internal combustion engine, and oil pan means which includes within its lower area on each side thereof rib means tapering away from a connecting flange means to one of the two parts consisting of the clutch housing means and the intermediate housing.

18. An internal combustion engine according to claim 17, characterized in that tapering rib means are provided laterally on a bottom side of the oil pan means such that forces can be transmitted from the flange means to the oil pan means.

* * * * *